United States Patent
Bahgat et al.

(10) Patent No.: US 9,940,324 B2
(45) Date of Patent: *Apr. 10, 2018

(54) PERFORMANCE DETECTION AND ENHANCEMENT OF MACHINE TRANSLATION

(71) Applicant: International Business Machines Corporation, Armonk, NY (US)

(72) Inventors: Mohamed A. Bahgat, Dublin (IE); Ossama Emam, Giza (EG); Ayman S Hanafy, Giza (EG); Sara A. Noeman, Giza (EG)

(73) Assignee: International Business Machines Corporation, Armonk, NY (US)

(*) Notice: Subject to any disclaimer, the term of this patent is extended or adjusted under 35 U.S.C. 154(b) by 1 day.

This patent is subject to a terminal disclaimer.

(21) Appl. No.: 14/825,300

(22) Filed: Aug. 13, 2015

(65) Prior Publication Data

US 2016/0267077 A1 Sep. 15, 2016

Related U.S. Application Data

(63) Continuation of application No. 14/643,060, filed on Mar. 10, 2015.

(51) Int. Cl.
G06F 17/28 (2006.01)

(52) U.S. Cl.
CPC ........ G06F 17/2854 (2013.01); G06F 17/289 (2013.01); *G06F 17/2827* (2013.01)

(58) Field of Classification Search
CPC ............... G06F 17/289; G06F 17/2827; G06F 17/2854; G06F 17/2836
See application file for complete search history.

(56) References Cited

U.S. PATENT DOCUMENTS

| | | |
|---|---|---|
| 6,349,276 B1 | 2/2002 | McCarley |
| 7,295,963 B2 | 11/2007 | Richardson et al. |
| 8,219,382 B2 | 7/2012 | Kim et al. |
| 8,249,855 B2 | 8/2012 | Zhou et al. |
| 8,296,127 B2 | 10/2012 | Marcu et al. |

(Continued)

FOREIGN PATENT DOCUMENTS

| | | |
|---|---|---|
| CN | 103678285 A | 3/2014 |
| JP | 2013186673 A | 9/2013 |
| KR | 1020140049150 | 4/2014 |

OTHER PUBLICATIONS

"8th Workshop on Statistical Machine Translation"; Proceedings of the Workshop; Aug. 8-9, 2013.

(Continued)

*Primary Examiner* — Richemond Dorvil
*Assistant Examiner* — Mark Villena
(74) *Attorney, Agent, or Firm* — Edward J. Wixted, III (57) ABSTRACT

In an approach for evaluating performance of machine translation, a processor receives a first document in a source language. A processor translates the first document in the source language to a second document in a target language, based, at least in part, on a first quantity of information. A processor evaluates the second document in the target language, based, at least, on one or more aspects of the translation. A processor determines, based, at least in part, on the evaluation, the second document in the target language meets a predetermined threshold.

16 Claims, 3 Drawing Sheets

(56) References Cited

U.S. PATENT DOCUMENTS

| | | | |
|---|---|---|---|
| 8,554,558 B2 | 10/2013 | McCarley et al. | |
| 8,612,203 B2 | 12/2013 | Foster et al. | |
| 8,831,928 B2 | 9/2014 | Marcu et al. | |
| 2004/0044530 A1* | 3/2004 | Moore | G06F 17/2827 704/254 |
| 2004/0102957 A1* | 5/2004 | Levin | G06F 17/2735 704/3 |
| 2004/0243392 A1* | 12/2004 | Chino | G06F 17/27 704/7 |
| 2006/0206798 A1* | 9/2006 | Kohlmeier | G06F 8/38 715/201 |
| 2007/0050182 A1* | 3/2007 | Sneddon | G06F 17/2854 704/2 |
| 2007/0192110 A1* | 8/2007 | Mizutani | G06F 17/289 704/277 |
| 2007/0250306 A1 | 10/2007 | Marcu et al. | |
| 2007/0265826 A1* | 11/2007 | Chen | G06F 17/2818 704/2 |
| 2009/0157386 A1 | 6/2009 | Zhou | |
| 2009/0319257 A1* | 12/2009 | Blume | G06F 17/278 704/7 |
| 2010/0179802 A1* | 7/2010 | Best | G06F 17/2809 704/2 |
| 2011/0082683 A1 | 4/2011 | Soricut et al. | |
| 2011/0288849 A1 | 11/2011 | Jang et al. | |
| 2013/0132064 A1* | 5/2013 | Hwang | G06F 17/2818 704/2 |
| 2013/0144592 A1* | 6/2013 | Och | G06F 17/28 704/2 |
| 2013/0173247 A1* | 7/2013 | Hodson | G06F 17/2827 704/4 |
| 2013/0262080 A1 | 10/2013 | Marciano et al. | |
| 2013/0346061 A1 | 12/2013 | Donabedian et al. | |
| 2014/0067361 A1 | 3/2014 | Nikoulina et al. | |
| 2014/0250219 A1* | 9/2014 | Hwang | G06F 17/2827 709/224 |
| 2014/0288915 A1* | 9/2014 | Madnani | G06F 17/289 704/2 |
| 2015/0106076 A1* | 4/2015 | Hieber | G06F 17/2854 704/2 |
| 2015/0286632 A1* | 10/2015 | Meunier | G06F 17/2854 704/2 |
| 2016/0012124 A1* | 1/2016 | Ruvini | G06F 17/30669 707/760 |
| 2016/0188576 A1 | 6/2016 | Huang | |

OTHER PUBLICATIONS

"Appendix P: List of IBM Patents or Patent Applications Treated As Related", Filed Aug. 13, 2015, pp. 1-2.

U.S. Appl. No. 14/643,060; filed Mar. 10, 2015; Entitled "Performance Detection and Enhancement of Machine Translation".

Martinez-Gomes, et al.; "Online adaptation strategies for statistical machine translation in post-editing scenarios"; Nov. 22, 2011.

Denkowski et a.; "Learning From Post-Editing: Online Model Adaptation for Statistical Machine Translation"; Proceedings of EACL, 2014; 10 Pages.

Denkowski et al.; "Real Time Adaptive Machine Translation for Post-Editing with cdec and TransCenter"; Proceedings of the EACL 2014 Workshop on Humans and Computer-assisted Translation; © 2014; 6 Pages.

Nepveu et al.; "Adaptive Language and Translation Models for Interactive Machine Translation"; 2004 Conference on Empirical Methods in Natural Language Processing (EMNLP 04); Jul. 25-26, 2004; 8 Pages.

European Application 16158717.5 International Search Report; dated Aug. 25, 2016; 7 Pages.

* cited by examiner

PERFORMANCE DETECTION AND ENHANCEMENT OF MACHINE TRANSLATION

TECHNICAL FIELD

The present invention relates generally to the field of statistical machine translations, and more particularly to detecting performance degradation and enhancing statistical machine translations.

BACKGROUND

Machine translation is a field of computational linguistics that investigates the use of software to translate text from one natural language to another. At the core of the technology, machine translation substitutes words in one natural language for words in another language. However, this alone cannot produce an understandable translation of text because recognition of whole phrases and their closest counterparts in the target language are needed. Machine translation has improved to translate words, phrases, and sentence structure through gathering data for both the source language and the target language and using this data to generate more linguistically accurate translations.

There are two major types of machine translation amongst many other types. The first major type of machine translation is rule-based machine translation, which uses a combination of language and grammar rules plus dictionaries for common words to translate the corpora from one language to another. A corpora is the plural version of corpus which is a collection of written texts, especially the entire works of a particular author or a body of writing on a particular subject. The other major type of machine translation is statistical machine translation; this type of machine translation has no knowledge of language rules. Instead, statistical machine translation "learns" to translate by analyzing large amounts of data for the source and target language including and not limited to, bilingual and monolingual text. Both major types of machine translation produce similar results; however, statistical machine translation delivers more fluent sounding translation, but at the cost of being less consistent with the translations.

SUMMARY

Embodiments of the present invention disclose a method, a computer program product, and a computer system for evaluating performance of machine translation. Aspects of an embodiment of the present invention include an approach for evaluating performance of machine translation, wherein the approach includes a processor receiving a first document in a source language. A processor translates the first document in the source language to a second document in a target language, based, at least in part, on a first quantity of information. A processor evaluates the second document in the target language, based, at least, on one or more aspects of the translation. A processor determines, based, at least in part, on the evaluation, the second document in the target language meets a predetermined threshold.

DETAILED DESCRIPTION

As will be appreciated by one skilled in the art, aspects of the present invention may be embodied as a system, method or computer program product. Accordingly, aspects of the present invention may receive the form of an entirely hardware embodiment, an entirely software embodiment (including firmware, resident software, micro-code, etc.), or an embodiment combining software and hardware aspects that may generally be referred to herein as a "circuit," "module", or "system." Furthermore, aspects of the present invention may receive the form of a computer program product embodied in one or more computer-readable medium(s) having computer readable program code/instructions embodied thereon.

Embodiments of the present invention recognize that there are many different methods and standards for detecting the performance of and enhancing the process for statistical machine translation. Embodiments of the present invention disclose a method for an automated process of both detecting performance degradation of deployed statistical machine translation, and initiating a learning process through automatically building up new bilingual training data that improves machine translation performance.

Implementation of embodiments of the present invention may take a variety of forms, and exemplary implementation details are discussed subsequently with reference to the Figures.

Embodiments of the present invention disclose a method, computer program product, and computer system, to detect performance degradation and enhance the process for statistical machine translation.

The present invention will now be described in detail with reference to the Figures.

Figure 1:
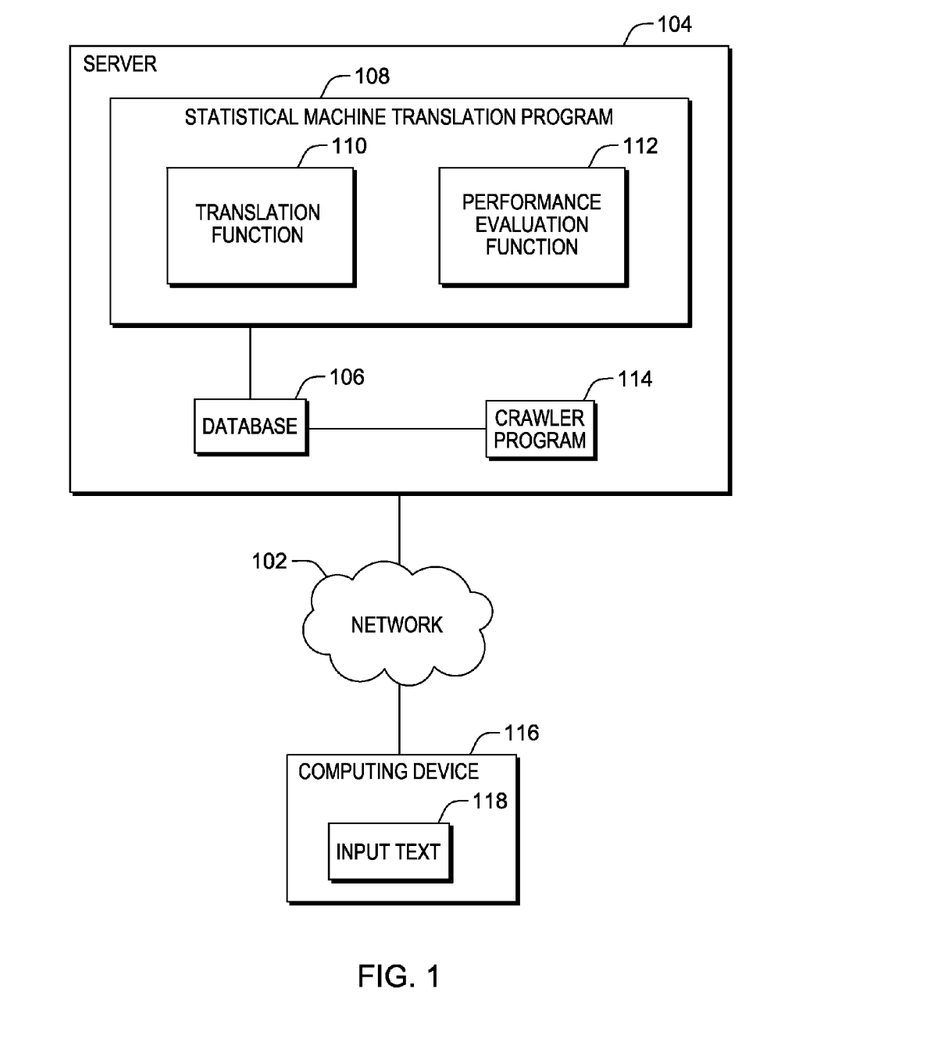
FIG. 1 depicts a block diagram of a computing environment, in accordance with one embodiment of the present invention.

FIG. 1 depicts a block diagram of a computing environment 100, in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102, server 104, and computing device 116. Computing environment 100 may include additional computing devices, servers, computers, components, or additional devices not shown. In an exemplary embodiment, computing environment 100 represents a performance degradation detection and enhancement environment.

Network 102 may be a local area network (LAN), a wide area network (WAN), such as the Internet, any combination thereof, or any combination of connections and protocols that support communications between server 104 and additional components connected to network 102, in accordance with embodiments of the invention. Network 102 may include wired, wireless, or fiber optic connections. In the depicted embodiment, network 102 connects server 104 and/or computing device 116. In other embodiments, network 102 connects server 104, computing device 116, and additional computing devices, servers, computers, components, or devices not shown.

Server 104 may be a management server, a web server, or other electronic device or computing system capable of processing program instructions and receiving and sending data. In some embodiments, server 104 may be a laptop computer, tablet computer, netbook computer, personal computer (PC), desktop computer, or any programmable electronic device capable of communicating with other components via network 102. In other embodiments, server 104 may represent a server computing system utilizing multiple computers as a server system, such as in a cloud computing environment. In another embodiment, server 104 represents a computing system utilizing clustered computers and components to act as a single pool of seamless resources. In the depicted embodiment, server 104 includes statistical machine translation program 108, database 106, and crawler program 114. In other embodiments, server 104 may include statistical machine translation program 108, database 106, crawler program 114, and additional programs, storage devices, or components. Server 104 may include components, as depicted and described in further detail with respect to FIG. 3.

Database 106 may be a repository that may be written to and/or read by statistical machine translation program 108 and crawler program 114. In one embodiment, database 106 contains, for example, training data, input text documents, translations into target languages, models created either by statistical machine translation program 108 or other model creating programs, and other relevant data, information and resources for the translation of text from the source language to the target language. A model is a document that is used for the evaluation of input text. The model can be in any number of languages. In another embodiment, database 106 is a corpus repository. In other embodiments, database 106 may be written to and/or read by statistical machine translation program 108, crawler program 114, and additional computing devices, servers, computers, components, or additional devices not shown. In one embodiment, database 106 stores input text, for example, input text 118 received from computing device 116 in computing device 116 via network 102, and the translations of input text 118. In one embodiment, database 106 is a database management system (DBMS), used to allow the definition, creation, querying, update, and administration of a database(s). In the depicted embodiment, database 106 is stored on server 104. In other embodiments, database 106 may reside on an alternative server, computer, or computing device, provided that database 106 is able to communicate with other devices, programs, and components.

Statistical machine translation program 108 manages, creates and allocates the information and resources that are used to translate and evaluate the translation of input text 118. Statistical machine translation program 108 creates, merges, allocates, stores, and controls other uses of the training data stored in database 106. The training data is used to improve the quality, and speed of the translation process. The training data can be, for example, monolingual data as previous translations in the target language, other documents in the target language, or bilingual data, such as similar documents in the source language and the corresponding translations in the target language, created either by humans, or automatically through using machine learning techniques. Statistical machine translation program 108 creates, merges, allocates, stores, and controls the models used to translate and evaluate the translation of input text 118. Statistical machine translation program 108 utilizes monolingual and bilingual training data to create such models used during translation process, such as translation models and language models. Statistical machine translation program 108 manages the storage and allocating of training data from database 106.

When statistical machine translation program 108 receives training data, statistical machine translation program 108 controls the storage of the training data in database 106. In the depicted embodiment, statistical machine translation program 108 communicates with computing device 116 to access input text 118, which is located on computing device 116. In one embodiment, statistical machine translation program 108 communicates with database 106 to access input text 118. In other embodiments, statistical machine translation program 108 communicates via network 102 with other servers, computers, or computing devices to access input text 118. In the depicted embodiment, statistical machine translation program 108 is located on server 104, along with database 106, and crawler program 114. In other embodiments, statistical machine translation program 108 can be located on an alternative server, computing device, or computer, provided statistical machine translation program 108 has access to database 106, crawler program 114, and input text 118 via network 102.

Translation function 110 translates input text 118 received by statistical machine translation program 108. Translation function 110 performs the translation from the original language to at least one additional language. Translation function 110 uses the training data and other resources that statistical machine translation program 108 has available or creates, such as translation models and language models, to translate input text 118 from the source language to at least one target language. In one embodiment, translation function 110 uses a crawler program, for example, crawler program 114, to gather information or data to be utilized to perform the translation of input text 118 from the source language to at least one target language. In one embodiment, translation function 110 communicates with database 106 to gather information and the required resources to translate input text 118 into at least one target language. In other embodiments, translation function 110 performs preprocessing on input text 118 to enhance the quality of the translation. In other embodiments, translation function 110 performs post processing on the translated text to enhance the quality of the translations of input text 118. In the depicted embodiment, translation function 110 is located within statistical machine translation program 108. In other embodiments, translation function 110 may stand alone as a program located on server 104, computing device 116, or any other computing device, provided that translation function 110 is accessible to statistical machine translation program 108.

Performance evaluation function 112 evaluates the translation of input text 118. Performance evaluation function 112 analyzes the quality of the translation of input text 118 to determine if the translation of the input text is adequate. Performance evaluation function 112 determines if the translation is adequate by the use of a predetermined threshold. The predetermined threshold can be, for example, based on considerations, such as the time it takes to complete the translation, the quality of the translation as compared with prior translations, the fluency of the translation, or other factors or scores, that performance evaluation function 112 determines are helpful to produce an adequate translation of input text 118 into at least one target language. If a translation fails to meet the predetermined threshold, performance evaluation function 112 determines, for example, where a failure occurred, why the failure occurred, and how to fix the failure. In one embodiment, performance evaluation function 112 sends the information regarding the failure of the translation to statistical machine translation program 108 to create new training data.

In one embodiment, performance evaluation function 112 uses a predetermined threshold for the quality of the translation of input text 118, where the predetermined threshold is a score from the prior translation. The score is a value that performance evaluation function 112 assigns to the translation, which can be used to determine if the translation meets the predetermined threshold. In various embodiments, the score may be assigned to a previous translation, based, at least in part, on a time to complete the translation or a quality of the translation, and the score may be assigned by a user of computing device 116 or by statistical machine translation program 108. In another embodiment, performance evaluation function 112 uses a predetermined threshold for the efficiency of the translation performed by translation function 110 that is based on a previous translation performed by translation function 110. The efficiency of the translation can be a comparison of the speed of the translation to the previous translation, a comparison of the number of mistakes in the translations, or a comparison of other factors that are related to the efficiency of the current translation and the previous translation. In other embodiments, performance evaluation function 112 requests translation function 110 to send debugging information along with the translated text to help in performance evaluation. In the depicted embodiment, performance evaluation function 112 is located within statistical machine translation program 108. In other embodiments, translation function 110 may stand alone as a program located on server 104, computing device 116, or any other computing device, provided that translation function 110 is accessible to statistical machine translation program 108.

Crawler program 114 searches for documents, files, or information which are requested by statistical machine translation program 108, translation function 110, or performance evaluation function 112 in source language and/or target language(s). The information for which crawler program 114 searches can be, for example, related to the failure of the translation, the fluency of the translation of input text 118, information that can be used for the translation of input text 118, or information regarding the fluency of the source language in input text 118. In one embodiment, crawler program 114 searches for documents which are related to the request from statistical machine translation program 108, translation function 110, or performance evaluation function 112. In one embodiment, crawler program 114 may search in database 106, the web, or additional computing devices, servers, computers, components, or devices not shown. In the depicted embodiment, crawler program 114 is located on server 104. In other embodiments, crawler 114 is located on additional computing devices, servers, computers, components, or devices not shown, provided statistical machine translation program 108 communicates with crawler program 114 via network 102.

Computing device 116 may be a desktop computer, laptop computer, tablet computer, netbook computer, personal computer (PC), a desktop computer, mobile device, or any programmable electronic device capable of communicating via network 102. In other embodiments, computing device 116 may be any electronic device or computing system capable of sending and receiving data and communicating with server 104 via network 102. In the depicted embodiment, computing device 116 is a source location for input text 118.

Input text 118 is a textual based document written in one or more languages. Input text 118 can be user inputted text, or an already existing document, such as a news article, a technical document, or a report. Input text 118 is the document that statistical machine translation program 108, translation function 110, and performance evaluation function 112 use to perform the translations and evaluations. Input text 118 can be in any form, file, or format, provided statistical machine translation program 108, translation function 110, and performance evaluation function 112 are compatible with the form, file, or format. In the depicted embodiment, input text 118 is located on computing device 116. In other embodiments, input text 118 can be located on additional computing devices, servers, computers, components, or devices not shown, provided statistical machine translation program 108 can access input text 118 via network 102.

Figure 2:
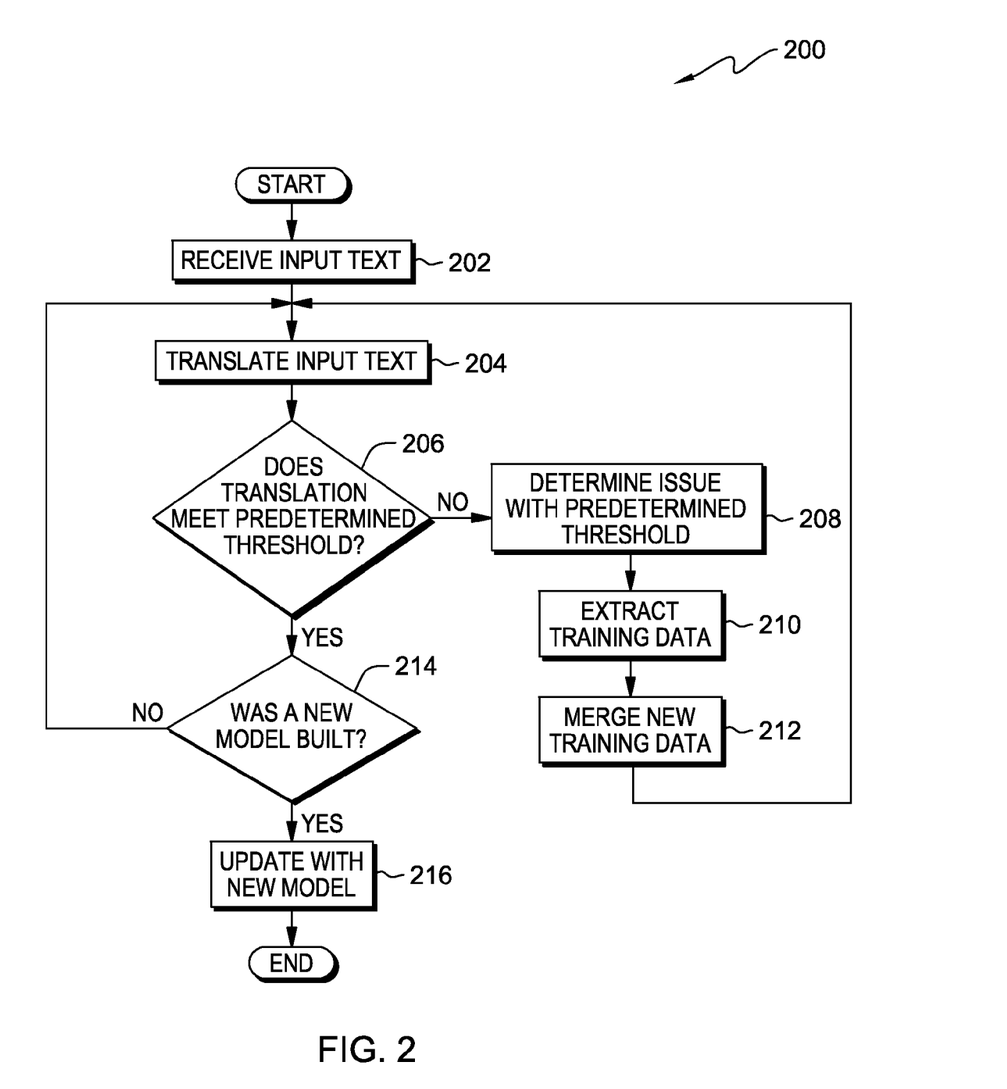
FIG. 2 depicts a flowchart depicting operational steps of a method for translating a text and evaluating the results of the translation, within the computing environment of FIG. 1, in accordance with one embodiment of the present invention.

FIG. 2 depicts flowchart 200 of the steps taken by statistical machine translation program 108 to detect performance degradation and enhance the process for statistical machine translation, within computing environment 100 of FIG. 1, in accordance with an embodiment of the present invention. Flowchart 200 depicts translation of input text 118, evaluation of the translation, and improvements on the translation of statistical machine translation program 108.

In step 202, statistical machine translation program 108 receives input text 118. In one embodiment, statistical machine translation program 108 receives input text 118 from computing device 116. In other embodiments, statistical machine translation program 108 receives input text 118 from database 106.

In step 204, statistical machine translation program 108 translates input text 118 from a source language to a target language. In one embodiment, translation function 110 translates input text 118 from the source language to the target language. In other embodiments, translation function 110 translates input text 118 to more than one language. In one embodiment, translation function 110 performs statistical machine translation. In other embodiments, translation function 110 performs additional forms of machine translations, such as transliteration, as well as statistical machine translation. In one embodiment, translation function 110 performs several machine translations on input text 118. In one embodiment, once the translation is complete, translation function 110 stores the model used for translation, input text 118, and the translation of input text in the target language or languages in database 106. In one embodiment, statistical machine translation program 108, or translation function 110, performs a form of preprocessing and/or post processing to improve the quality and accuracy of the translation. Forms of preprocessing and post processing include, but are not limited to, tokenization, sentence alignment, stemming, named entity recognition, and lexical similarity recognition.

In one embodiment, translation function 110 translates input text 118 using information from database 106. The information from database 106, for example, can be previously created models, such as language models and translation models, or other resources or text documents that would assist the translation to the target language. Features of the models used for the translation for which translation function 110 may search for can be lexical features, vocabulary, sentence structure, content, topics or additional aspects that would assist in translating text from the source language to at least one target language.

In decision 206, statistical machine translation program 108 determines if an evaluation of the translation of input text 118 by statistical machine translation program 108 or translation function 110 meets a predetermined threshold. The predetermined threshold may be determined based on the accuracy of the translation, quality of the translation, efficiency of the translation, speed of the translation, or other forms of degradation or improvement in the translation from input text 118. In one embodiment, performance evaluation function 112 determines if the evaluation of the translation of input text 118 by translation function 110 to the target language or languages meets a predetermined threshold. In one embodiment, the predetermined threshold is set by performance evaluation function 112. In another embodiment, the predetermined threshold is set by a user or an external source. In one embodiment, performance evaluation function 112 uses input text 118 and its translation output to analyze the performance of the machine translation. If the translation of input text 118 meets the predetermined threshold, statistical machine translation program 108 determines if a new model was built for the translation from new or additional training data (yes branch, proceed to decision 214). If the translation of input text 118 does not meet the predetermined threshold requirements, performance evaluation function 112 determines one or more issues with the translation of input text 118 (no branch, proceed to step 208).

In step 208, statistical machine translation program 108 determines an issue with the predetermined threshold based on the evaluation of the translation of input text 118 based on the predetermined threshold. The issues with the predetermined threshold can be areas of the models that performance evaluation function 112 determined were not met, for example, a percentage of words translated, a percentage of words not translated, or speed of translation. In one embodiment, performance evaluation function 112 determines the issues with the predetermined threshold using the models. Performance evaluation function 112 gathers the information regarding the translation from translation function 110. For example, the information gathered can be words that were skipped because no translation was known by translation function 110, sentences that could not be altered to be fluent in the target language, words that were misspelled in input text 118 that could not be translated, words with more than one translation, performance related results, results related to sentence and/or word scores, alignment scores, language model scores, additional scores, or other issues that could arise with input text 118, the translation of input text 118, or the models that were used during the translation process. In one embodiment, performance evaluation function 112 uses an out-of-vocabulary ratio (OOV) to determine the amount of words in input text 118 that were not translated. In one embodiment, performance evaluation function 112 requests a retranslation by translation function 110 of input text 118 if performance evaluation function 112 determines that the translation had issues, such as, but not limited to, the translation stopping after only a portion of input text 118 was translated, or if translation function 110 experienced an error. In one embodiment, performance evaluation function 112 requests translation function 110 to perform the translation of input text 118 in another language, analyze the new translation and compare the scores. For example, the issues with input text 118 can be grammatical errors, format issues, accent mistakes, or punctuation errors. In other embodiments, performance evaluation function 112 communicates with database 106 to extract prior translations in the target language to compare with the current translations to detect changes in the target language, reoccurring issues, topics that tend to have more issues with the predetermined threshold than other topics, or other factors that would be beneficial to solving the issues with the predetermined threshold.

In step 210, statistical machine translation program 108 extracts training data to aid with solving the issues present in the output translations. In an embodiment, the training data is any information that can be used to solve issues with the predetermined threshold in the output translations that was not used by performance evaluation function 112 when the output translations were first evaluated. In one embodiment, performance evaluation function 112 extracts training data to solve issues with the predetermined threshold present in the output translations. In one embodiment, performance evaluation function 112 searches database 106 for information that can be used to fix issues with the predetermined threshold. Examples of this information may include, but are not limited to, translations in the target language of input text 118 or translations in other languages that can assist in solving issues with the predetermined threshold. The quantity of translations can help determine if the error has appeared in a previous translation, how the error was fixed if the error did appear in the past, or if the error is being experienced for the first time.

In some embodiments, performance evaluation function 112 uses crawler program 114 to search the web, or other computing devices in computing environment 100 (not shown), for information that can help solve issues with the predetermined threshold. In one embodiment, crawler program 114 searches the web for information, such as, documents in the source language, documents in the target language, documents in other languages that relate to the topic or topics of input text 118, dictionaries in the target language and the source language, or other pieces of information that can assist performance evaluation function 112 in solving issues with the predetermined threshold. In one embodiment, crawler program 114 searches corpora for documents in both the source and target language to assist in fixing issues with the predetermined threshold. For example, corpora can be, but not limited to, parallel corpora (large text databases in both the source and target language), limited corpus, comparable corpus, corpora that was translated by machine, or corpora that was translated by human. The documents searched for can also be limited based on a publishing date, content, topic of the document, or length. In one embodiment, performance evaluation function 112 creates a report that is presented to an operator to show issues with the predetermined threshold and the solutions issues with the predetermined threshold.

In step 212, statistical machine translation program 108 merges the new training data with the training data stored in database 106. In one embodiment, statistical machine translation program 108 overrides the previously stored training data in database 106 with the extracted training data if there is similar information between the extracted training data and the stored training data. In one embodiment, statistical machine translation program 108 adds the extracted training data to the previously stored training data in database 116 even if there are similarities between the extracted training data and the stored training data. In one embodiment, statistical machine translation program 108 can build new models to be used in a translation process, using the extracted training data and either using the new models alone or merge them with the previous models through different techniques, such as interpolation, or weighting. In other embodiments, statistical machine translation program 108 adds the extracted training data and uses the extracted training data to update the previous models.

In decision 214, after determining the translation of input text 118 meets the predetermined threshold, statistical machine translation program 108 determines if a new model was built. If at least one new model is created, statistical machine translation program 108 updates database 106 with the new models (yes branch, proceed to step 216). If no new models were created, statistical machine translation program 108 determines the translation performance has not degraded, and translates input text using the current models (no branch, proceed to step 204). In one embodiment, statistical machine translation program 108 compares a model used for a translation that failed to meet the predetermined threshold to a model used for a translation that meets the predetermined threshold to determine if the two models exceed a percentage of similarity. The percentage of similarity is used to show that the two models are slightly different. Due to the slight difference, the model used that met the predetermined threshold requirements is an improvement on the model that failed to meet the predetermined threshold.

In step 216, statistical machine translation program 108 updates database 106 with the model(s). Statistical machine translation program 108 sends the model or models to database 106 to be stored for future translations. In one embodiment, the new model(s) is/are added to the previous quantity of model(s) in database 106. In one embodiment, the new model(s) override the existing version of the model in database 106. The old version of the model can be overridden because the old model failed to meet the predetermined threshold, the old version of the model is outdated, input text 118 has been modified making the old version of the model obsolete, or other reasons not listed here.

Figure 3:
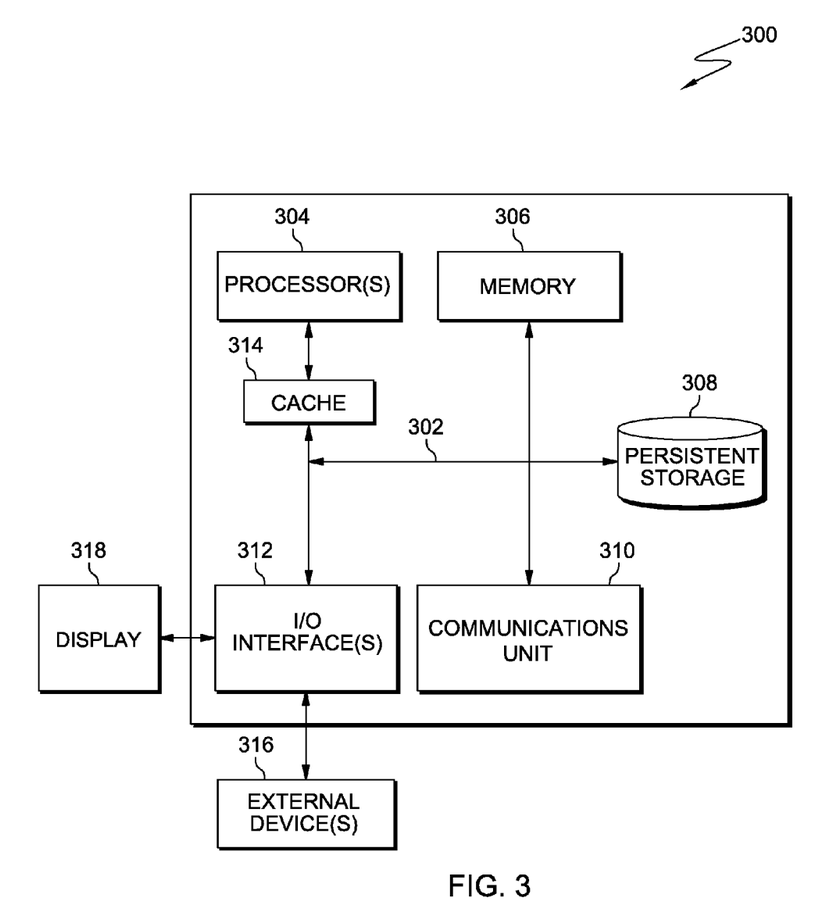
FIG. 3 depicts a block diagram of internal and external components of the computing device(s) and servers of FIG. 1, in accordance with one embodiment of the present invention.

FIG. 3 depicts a block diagram 300 of components of server 104 and/or computing device 116, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 104 and/or computing device 116 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any additional hardware components within a system. For example, communications fabric 302 can be implemented with one or more buses.

Memory 306 and persistent storage 308 are computer-readable storage media. In one embodiment, memory 306 includes random access memory (RAM) and cache memory 314. In general, memory 306 can include any suitable volatile or non-volatile computer-readable storage media.

Memory 306 is stored for execution by one or more of the respective computer processors 304 of server 104 and/or computing device 116 via one or more memories of memory 306 of server 104 and/or computing device 116. In the depicted embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in the examples, provides for communications with other data processing systems or devices, including server 104 and/or computing device 116. In the examples, communications unit 310 includes one or more network interface cards. Communications unit 310 may provide communications through the use of either or both physical and wireless communications links.

I/O interface(s) 312 allows for input and output of data with other devices that may be connected to server 104 and/or computing device 116. For example, I/O interface 312 may provide a connection to external devices 316 such as a keyboard, keypad, camera, a touch screen, and/or some other suitable input device. External devices 316 can also include portable computer-readable storage media such as, for example, thumb drives, portable optical or magnetic disks, and memory cards. Software and data used to practice embodiments of the present invention, e.g., function of statistical machine translation program 108 can be stored on such portable computer-readable storage media and can be loaded onto persistent storage 308 of server 104 and/or computing device 116 via I/O interface(s) 312 of server 104 and/or computing device 116. Software and data used to practice embodiments of the present invention, e.g., statistical machine translation program 108 can be stored on such portable computer-readable storage media and can be loaded onto persistent storage 308 of server 104 and/or computing device 116 via I/O interface(s) 312 of server 104 and/or computing device 116. I/O interface(s) 312 also connect to a display 318.

Display 318 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for evaluating performance of machine translation, the method comprising:
   receiving, by a machine translation device, a first document in a source language;
   translating, by a machine translation device, the first document in the source language to a second document in a target language, based, at least in part, on a first quantity of information, wherein the first quantity of information is obtained through, at least, preprocessing, before the translation, wherein the preprocessing includes, at least, tokenization;
   subsequent to the translation, performing, by a machine translation device, post processing to obtain a second quantity of information, wherein the post processing includes, at least, tokenization;
   evaluating, by a machine translation device, the second document in the target language, based, at least, on one or more aspects of the translation, the preprocessing, and the post processing, wherein the evaluation of the second document in the target language, based, at least, on the one or more aspects of the translation further comprises:
   comparing, by the machine translation device, the one or more aspects of the translation of the first document in the source language to the second document in the target language with a predetermined threshold, based, at least, on the first quantity of information and the second quantity of information; and determining, by the machine translation device, whether the comparison of the one or more aspects of the translation of the first document in the source language to the second document in the target language is greater than the predetermined threshold; and responsive to determining that the comparison of the one or more aspects of the translation of the first document in the source language to the second document in the target language is not greater than the predetermined threshold, translating, by the machine translation device, the first document to the second document, using available models, wherein the translation comprises:

determining, by the machine translation device, that no new models are created and that no degradation has taken place on a translation performance;

comparing, by the machine translation device, a first model used for a translation that failed to meet the predetermined threshold to a second model used for a translation that meets the predetermined threshold; and determining, by the machine translation device, that the first model and the second model exceeds a percentage of similarity, wherein the percentage of similarity is used to show that the first model and the second model are different and due to the difference, the second model is an improvement on the first model.

2. The method of claim 1, responsive to determining that the comparison of the one or more aspects of the translation of the first document in the source language to the second document in the target language are not greater than the predetermined threshold for the one or more aspects of the translation, modifying, by a machine translation device, the second document in the target language to exceed the predetermined threshold, based, at least, on the one or more aspects of the translation.

3. The method of claim 2, further comprising, responsive to modifying, by a machine translation device, the second document in the target language:

collecting, by a machine translation device, a third quantity of information;

merging, by a machine translation device, the third quantity of information with the first quantity of information and the second quantity of information to form a fourth quantity of information;

translating, by a machine translation device, the first document in the source language to a third document in the target language using the fourth quantity of information;

evaluating, by a machine translation device, the third document in the target language, based, at least, on one or more aspects of the translation; and determining, by a machine translation device, based, at least, on the evaluation, whether the third document in the target language meets the predetermined threshold, based, at least, on the one or more aspects of the translation.

4. The method of claim 1, responsive to determining that the comparison of the one or more aspects of the translation of the first document in the source language to the second document in the target language are greater than the predetermined threshold, creating, by a machine translation device, a third model in the target language, wherein the third model has features that include, at least, lexical, vocabulary, sentence structure, content, and topic.

5. The method of claim 1, wherein the one or more aspects of the translation includes at least one of one or more language model scores, an efficiency of the translation, an alignment score, or a word translation score.

6. The method of claim 1, wherein translating the first document in the source language further comprises translating the first document in the source language to a plurality of documents in a plurality of target languages.

7. The method of claim 1, wherein the preprocessing includes, at least, sentence alignment.

8. The method of claim 1, wherein the preprocessing includes, at least, stemming.

9. The method of claim 1, wherein the preprocessing includes, at least, named entity recognition.

10. The method of claim 1, wherein the preprocessing includes, at least, lexical similarity recognition.

11. The method of claim 1, wherein the preprocessing includes, at least, tokenization, sentence alignment, stemming, named entity recognition, and lexical similarity recognition.

12. The method of claim 1, wherein the predetermined threshold is determined based on, at least, accuracy of the translation.

13. The method of claim 1, wherein the predetermined threshold is determined based on, at least, quality of the translation.

14. The method of claim 1, wherein the predetermined threshold is determined based on, at least, efficiency of the translation.

15. The method of claim 1, wherein the predetermined threshold is determined based on, at least, speed of the translation.

16. The method of claim 1, wherein the predetermined threshold is determined based on, at least, accuracy of the translation, quality of the translation, efficiency of the translation, and speed of the translation.

* * * * *